United States Patent [19]
Atalla et al.

[11] Patent Number: 4,885,779
[45] Date of Patent: Dec. 5, 1989

[54] PERSONAL IDENTIFICATION ENCRYPTOR SYSTEM WITH ERROR-CORRECTING CODE AND METHOD

[75] Inventors: Martin M. Atalla, Atherton; Alan Roberts, Palo Alto, both of Calif.

[73] Assignee: Atalla Corporation, San Jose, Calif.

[21] Appl. No.: 115,210

[22] Filed: Nov. 2, 1987

[51] Int. Cl.⁴ .............................................. H04L 9/04
[52] U.S. Cl. .......................................... 380/56; 380/57
[58] Field of Search .................................... 380/56, 57

[56] References Cited

U.S. PATENT DOCUMENTS

| | | | |
|---|---|---|---|
| 1,440,585 | 1/1923 | Corrigan | 380/56 |
| 2,313,012 | 3/1943 | Garnier | 380/57 |
| 2,413,592 | 12/1946 | Strother | 380/56 |
| 2,624,958 | 1/1953 | Fine | 380/56 |
| 4,408,093 | 10/1983 | Place | 380/56 |

Primary Examiner—Salvatore Cangialosi
Attorney, Agent, or Firm—Fitch, Even, Tabin & Flannery

[57] ABSTRACT

An inexpensive encryption device, system and method includes coded alphanumeric characters preprinted according to different key codes on mail-out forms that can be manipulated by a prospective user to yield encrypted data that can be returned over unsecure transmission channels for secure decryption by the operator of a computer-secured operating system. Error-correcting encoding is included to obviate the effects upon telephone keypad entry of secured data that includes error-prone alpha and numeric characters.

6 Claims, 11 Drawing Sheets encrypt  decrypt
(SAMPLE ARRAY PER KEY CODE $K_x$)

|  |  | SELECT 1 OF N SHUFFLES | | | SELECT 1 OF N SHUFFLES | | | SELECT 1 OF N SHUFFLES | | |
|---|---|---|---|---|---|---|---|---|---|---|
|  |  | $K_{AA}$ | $K_{AB}$ | --- | $K_{Ai}$ | $K_{AX}$ | $K_{AZ}$ | $K_{XX}$ | $K_{Xj}$ | $K_{XN}$ |
| 0 | 0 | R | N | 2--- | D | E | M--- | G | W | 6--- |
| 1 | 1 | 3 | G | H | N | L | X | S | P | L |
| 2 | 2 | 8 | S | 0 | P | 3 | A | T | 7 | W |
| 3 | 3 | 7 | W | X | R | C | 8 | H | | 8 |
| 4 | 4 | W | 3 | A | 2 | | | 4 | | |
| 5 | 5 | 8 | T | 7 | A | | | | | |
| 6 | 6 | V | | | H | | | | | |
| 7 | 7 | P | | | 5 | | | | | |
| 8 | 8 | 1 | | | | | | | | |
| 9 | 9 | S | | | | | | | | |
| A | 2 | T | | | | | | | | |
| B | 2 | X | | | | | | | | |
| C | 2 | 4 | | | | | | | | |
| D | 3 | C | | | | | | | | |
| E | 3 | A | | | | | | | | |
| F | 3 | D | | | | | | | | |
| G | 4 | Y | | | | | | | | |
| H | 4 | N | | | | | | | | |
| I | 4 | 5 | | | | | | | | |
| J | 5 | U | | | | | | | | |
| K | 5 | L | | | | | | | | |
| L | 5 | O | | | | | | | | |
| M | 6 | M | | | | | | | | |
| N | 6 | E | | | | | | | | |
| O | 6 | H | | | | | | | | |
| P | 7 | 6 | | | | | | | | |
| R | 7 | F | | | | | | | | |
| S | 7 | 2 | | | | | | | | |
| T | 8 | J | | | | | | | | |
| U | 8 | G | | | | | | | | |
| V | 8 | 9 | | | | | | | | |
| W | 9 | I | | | | | | | | |
| X | 9 | K | | | | | | | | |
| Y | 9 | 0 | | | | | | | | |

26 ─ column (A), 28 ─ column (B)

(A) (CLEAR TEXT)  (B) FIRST PIN CHARACTOR  (C) SECOND PIN CHARACTOR  (D) $N^{TH}$ PIN CHARACTOR

PERSONAL IDENTIFICATION ENCRYPTOR SYSTEM WITH ERROR-CORRECTING CODE AND METHOD

RELATED CASE

The subject matter of this application relates to the subject matter of pending patent application Ser. No. 846,556, entitled "Personal Identification Encryptor System and Method", filed Mar. 31, 1986, by Martin M. Atalla.

BACKGROUND OF THE INVENTION

Systems that are secured for use by authorized individuals commonly rely upon a Personal Identification Number (PIN) that is assigned to, or selected by, the individual and that must be remembered by the individual for use in the system to verify his identity as an authorized user. For enhanced security against unauthorized users, such a secured system should permit the PIN of any character length to be selected by the authorized user rather than be assigned by, or be otherwise known to, the authorizing institution that operates the secured system. In addition, any use made of the PIN by the authorizing institution should ideally be only in encrypted form or within a security module so that the PIN of an authorized user is never available in unsecured form or in clear, readable text. Also, where large populations must be authorized to use the secured system, each user should be provided with a unique authorization by a scheme that is conducive to mass handling, with little opportunity for error and at low cost. In addition, the institution operating the secured system commonly requires a record signature of the authorized user.

Conventional secured banking systems typically assign a PIN or require the user to appear in person to select a PIN and to provide other information and a record signature. For a large population of users, it should be possible to complete the authorization process by mail without compromising the PIN or other information about the user. However, current procedures for completing user authorization at remote sites (via mail or telephone, or the like) commonly require clear text transfer of the PIN and other information and such procedures thus involve unacceptable risks of loss of secured information about a user.

SUMMARY OF THE INVENTION

In accordance with the present invention, unique encryptors are prepared at low cost for general distribution to a large population of prospective users of a secured system, and the user may then manipulate the encryptor in privacy to generate coded information that is unique to the user and that may be mailed or otherwise transmitted in unsecured manner to the operator of the secured system without losing secured information about the user, or compromising the security of the system. In addition, the system and method of the present invention enable the operator of the system to securely process the authorization of the prospective user from the coded information generated by manipulation of the encryptor. Thereafter, the encryptor may be destroyed to assure that uniquely coded information for that user will not be regenerated and compromised.

The preferred embodiment of the low cost encryptor according to the present invention includes a plurality of printed arrays of alphanumeric characters that can be relatively positioned in correlated pairs or sets. The arrays of characters are shifted in accordance with selected keys, and the user's manipulation of the encryptor establishes the selected correlations between character arrays to provide coded information that is unique to that user having manipulated that particular encryptor. Sets of number and characters that are prone to error in reading or entering on a telephone key pad are specially encoded to reduce the effect of such reading and entry errors. By thereafter destroying the encryptor, the user preserves security against detection or regeneration of his identifying information, and information about the encryptor and the codes generated by the manipulation of it can be conveniently transmitted via unsecured channels such as mail or telephone networks back to the system operator for secure decryption and processing.

DESCRIPTION OF THE PREFERRED EMBODIMENT

Figure 1A:
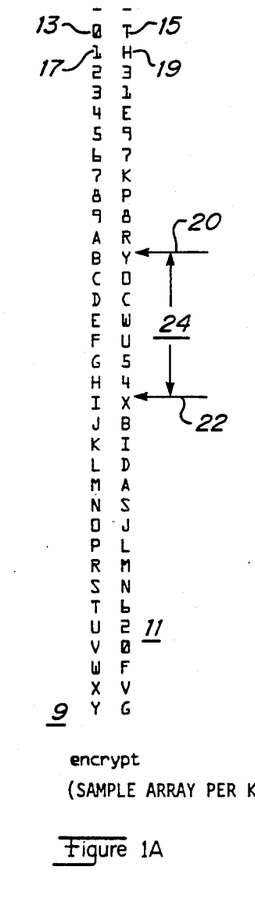
FIGS. 1A and 1B are arrays of encrypted and decrypted alphanumeric characters according to key code $K_x$.

Referring now to FIG. 1A, there is shown a linear sequential array 9 of numerical and alphabetical characters arranged vertically on the left in usual order and an array 11 of the same numerical and alphabetical characters arranged vertically on the right in encrypted manner. The spatial correlation between the alphanumeric characters in the two columns is preserved over the length of the arrays. Thus, the first characters 13, 15 in each column are indexed together, the second characters 17, 19 in each column are indexed together, and so on through the array of characters to the last characters in each column which are also spatially indexed together.

Figure 2:
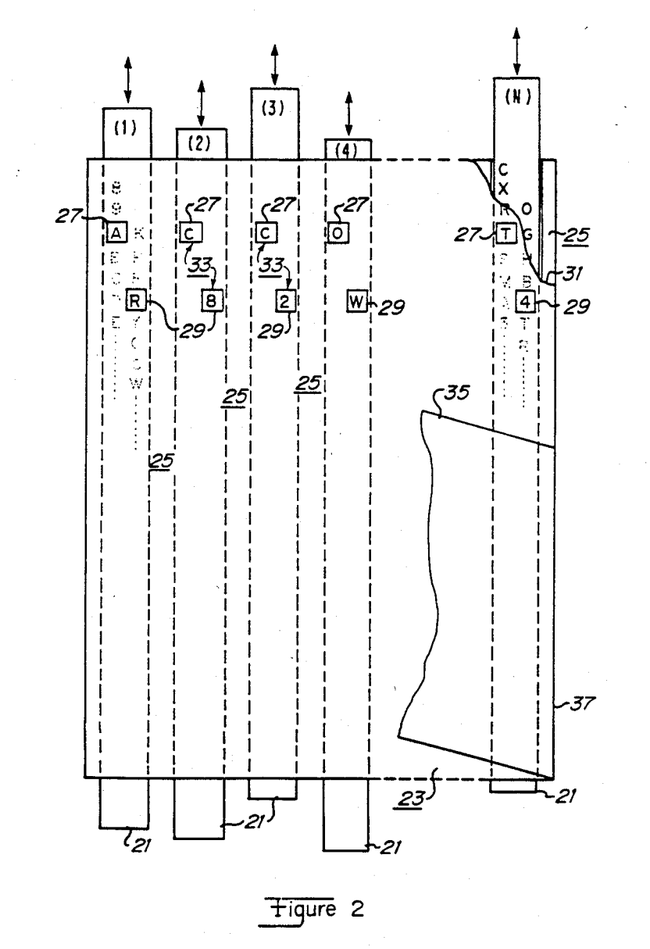
FIG. 2 is a partial cut-away view of an encryptor according to one embodiment of the present invention.
Figures 3, 4:
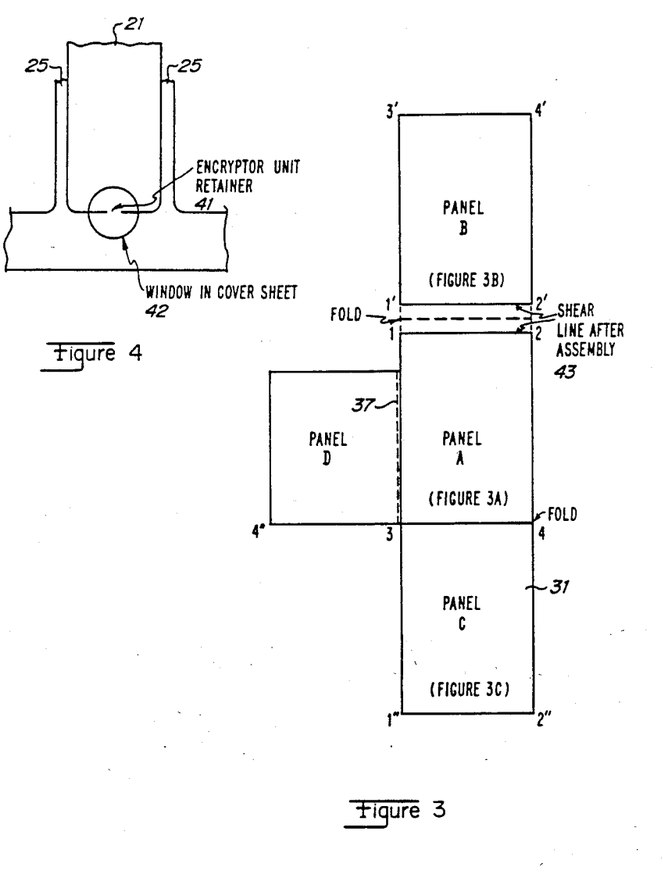
FIGS. 3, 3A, 3B and 3C comprise a plan view of showing the assembly of one encryptor embodiment on a single sheet of paper.
FIG. 4 is a partial cut-away view of the encryptor unit retaining tabs for the individual encryptor units illustrated in FIG. 3B.
Figure 3A:
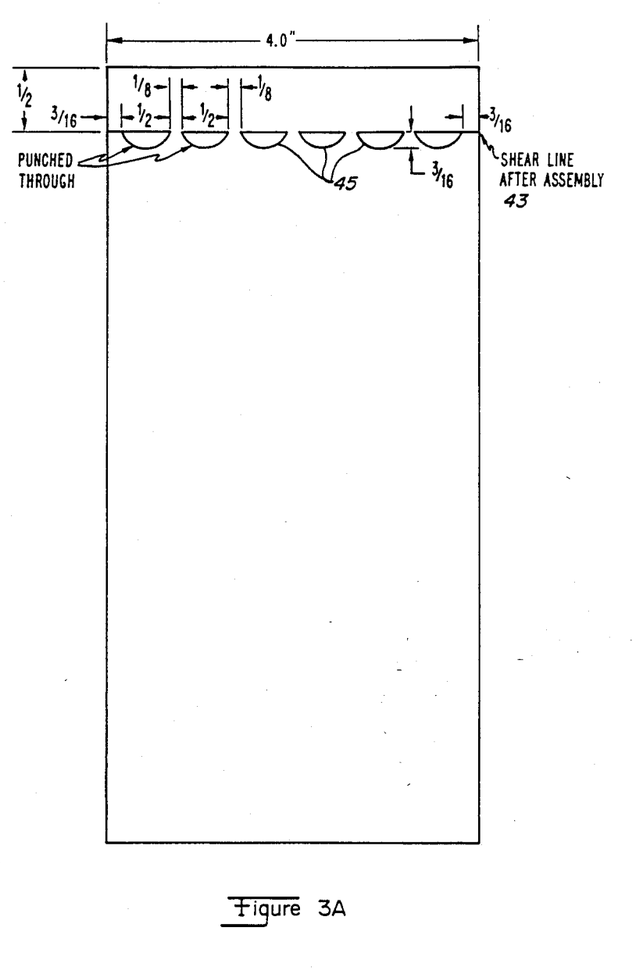
Figure 3B:
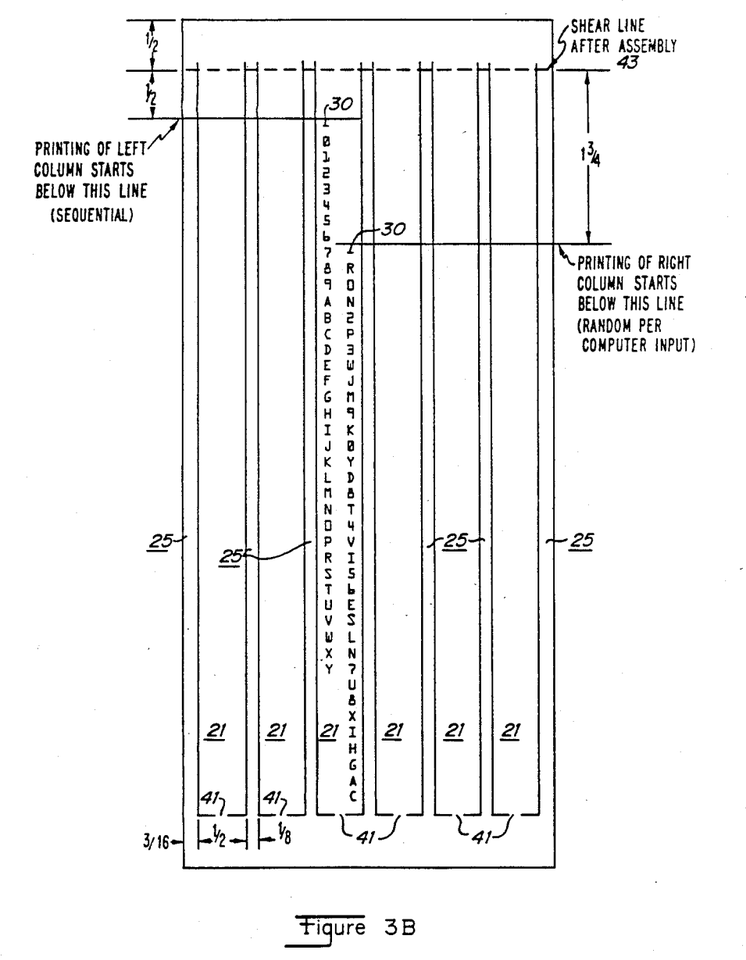

Of course, the pairs of alphanumeric arrays may be relatively spatially indexed 30 by equal spacings from the beginning of an array (or from the first character) to say, the eighth character in the right-column array, as shown in FIG. 3B. This spacing has a corresponding spacing between the beginning (or the first character) and the eighth character in the left-column array. In other words, the linear position of the right column array of characters may be spatially displaced downwardly relative to the corresponding left-column characters for convenience, as later described in connection with the illustrated embodiment of FIG. 2.

The correlation of alphanumeric characters in the left and right columns 9, 11 may be encrypted according to any known encryption scheme. For example, using the set of 34 numerical and alphabetical characters in the left column 9 for reference (omitting Q and Z), it is possible to select any one of the same 34 characters as the character in the first indexed position in the right column 11 to correspond to the character 13 in the first indexed position in the left column 9. For unambiguous encryption and decryption of those corresponding characters, the character 19 in the second indexed position in the right column may be selected to be any one of the remaining 33 characters to correspond to the character 17 in the second indexed position in the left column. Similarly, the third indexed character in the left column may be selected to be any one of the remaining 32 characters, the fourth indexed character in the left column may be selected to be any one of the remaining 31 characters, and so on, for 34 factorial (34!) possible encrypted combinations of the 34 alphanumeric characters in the two-column, spatially-corresponding arrays.

Figure 1B:
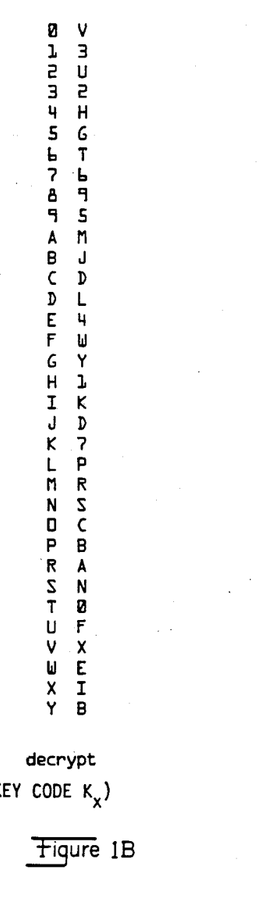

Each of the 34 factorial possible combinations of corresponding characters is known, and some or all of these combinations can be identified by individual key codes, and they can therefore be used to encrypt and decrypt clear-text messages if the individual key code is known. Thus, alphanumeric characters selected from the left-column array 9 are encrypted as correspondingly-indexed characters in the right column 11 and these right-column characters can then be transmitted with the associated key code and be unambiguously recovered, for example, by referring to the inverse array, as shown in FIG. 1B, of the same characters in the encoded relationships for the associated key code, as shown in FIG 1A. Thus, a message, a PIN, or other data word such as

"PARTICLE"

would be encrypted by referring to the particular one-out-of-34 factorial possible combinations of corresponding characters shown in FIG. 1A, as

"LRM6XODW"

This encrypted message can be transmitted over unsecure communication channels, along with the key code, $K_x$, associated with the unique one-out-of-34-factorial encoded combinations that was used to encrypt the message, without compromising the security of the message. The received encrypted message can be decrypted, with reference to the inverse of the one-out-of-34-factorial array, as shown in FIG. 1B, as:

"PARTICLE"

Of course, a plural number of different unique arrays may be used, one for each character position, for enhanced security and for ease of operation in an inexpensive encryptor, as shown in FIG. 2.

Referring now to FIG. 2 there is shown a plural number (n) of encryptor units 21 which form an inexpensive PIN encryptor 23 for use in initially authorizing a prospective user of a secure system. Each of the number (n) of encryptor units 21 is arranged to slide up and down relative to the spacers 25, as manipulated by the prospective user. Each encryptor unit 21 carries a pair of vertically-oriented alphanumeric character arrays, encrypted as previously described. One of 34 factorial possible different encryptor units 21 may be provided in each column location, yielding at least 34×n (!) unique encryptors. The encryptor 23 thus formed is identified by the codes ($K_x$) associated with each encryptor unit 21 in the columnar sequence in which they are assembled. An encryptor 23 is identified by the unit codes, in sequence: $K_1, K_2, K_x, — K_n$.

A pair of indexers such as pointers or windows 27 and 29 may be relatively positioned adjacent the vertical array of alphanumeric characters on each encryptor unit 21. In this embodiment, the cover sheet 31 may contain suitable printed instructions for entering any multi-character PIN within the upper set of windows 27 (corresponding to the left-column character arrays on the encryptor unit 21) by manually sliding or positioning the encryptor units 21 per column to display the selected PIN character-by-character in the upper windows. This manipulation of the individual encryptor units 21 causes the corresponding encrypted characters per encryptor unit 21 to be displayed in the lower windows 29 (corresponding to the right-column character arrays on the encryptor units 21). The PIN that is entered in the upper windows 27 is therefore displayed in encrypted form in the lower windows 29. Of course, the lower windows or indexers 29 may be spaced at different distances 33 from the beginning or first character position to provide an offset code within the encrypted form of the PIN.

For convenience, a removable flap 35 is folded over the cover sheet 31 to provide place for entry of such information as the encrypted PIN, the account number, terms and conditions of use of the secured system, instructions for using the encryptor, name and signature of the prospective user, and code information that identifies this particular encryptor with its unique combination of (n) different encryptor units 21 (and offset codes, if any, associated with indexer spacings 33) that form the encryptor. After using the encryptor to encode a selected PIN, the flap 35 containing the above information is detached along fold 37 and returned by mail to the operator of the secure system where the PIN may be decrypted using the supplied code information. Of course, other combinations of encrypted and clear-text information may also be communicated to the system operator. For example, the account number may be encrypted and communicated with the selected PIN in clear text but with no identity of the user. Alternatively, the selected PIN and the account number and other information may be encrypted using the encryptor and then communicated to the system operator in encrypted form using unsecure communication channels. The encryptor may thereafter be destroyed by the user to assure unique encryption of such user's own PIN and associated data.

The encryptor illustrated in FIG. 2 may be formed from a single sheet of paper or plastic, or the like, as shown in FIG. 3, and may be printed on one surface using conventional computer-controlled, high-speed printing processes before being punched, sheared to shape, folded, and assembled. In this way, all textual details and the vertical arrays of distinctively encrypted characters per encryptor unit 21 may be printed on one surface of the sheet along with code information to identify the particular combination of encryptor units 21 printed on the sheet. Thereafter, a punch operation may be employed, to trim the printed sheet to shape, as shown in FIG. 3, to cut the windows 27, 29, 42 in the cover sheet 31, to form the cutouts 39 above pairs of windows, and to cut the vertical edges of the encryptor units 21 (but only portions of the ends of the encryptor units 21 in order to retain them 41 in place in the sheet, as shown in FIGS. 3B and 4).

Figure 3C:
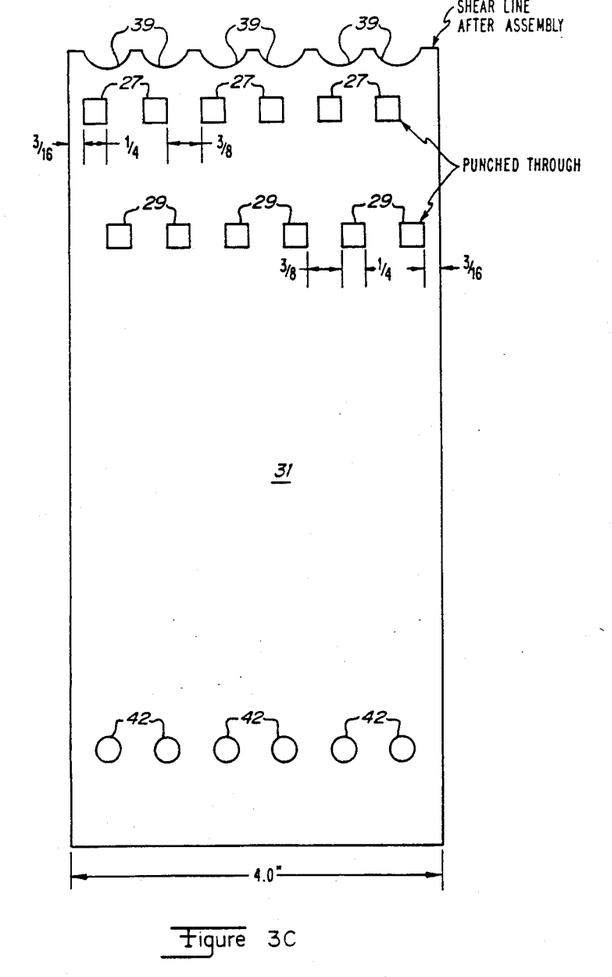

Next, the printed, shaped and punched sheet is folded to assemble the sheet of encryptor units 21 (still captive within the sheet, as shown in FIG. 3B) between the back sheet (FIG. 3A) and the cover sheet 31 (FIG. 3C) with the windows 27, 29 aligned over the respective vertical arrays of characters on each encryptor unit 21, and with flap 35 perforated for easy tear-off and folding 37 over the portion of the cover sheet that is below the lower windows 29. Adhesive attachment of the spacers 25 to the back and cover sheets retains the folded sheet in 'assembled' form. Thereafter, the top edge of the back, cover and spacer sheet is sheared off 43 parallel to the top fold to substantially release the individual encryptor units 21 and to form 'scalloped' finger openings 45 for each individual encryptor unit 21. Each encryptor 23 thus produced is unique, is identified by coded information representative of the combinations of encrypted character arrays assembled within it (and any offset codes included), and is ready to be distributed at random to an individual user within a large population of prospective users. When received, a user inspects the retainer tabs 41 through the window 42 in the cover sheet to assure that encryptor units 21 have not been moved, and may then cut or punch through the tabs 41 to release the individual encryptor units 21 for slidable manipulation.

In another embodiment of the present invention, a single vertical column of alphanumeric characters may be arranged in an encoded array, as illustrated in FIG. 1A, to form each encryptor unit, with a pair of indexers or 'windows' 20,22 spaced at various distances from each other for each encryptor unit. In this embodiment, the selected spacing 24 between indexers 20,22 constitutes a variable offset code in the encryption and decryption of the array of characters and provides an additional level of code complexity for enhanced security of the system. For convenient telephone transmission of information derived from the encryptor, it is appropriate to eliminate the letters Q and Z, as illustrated in FIGS. 1A and 1B, and it may be appropriate to include '#' and '*' symbols in the coded array of characters on each encryptor unit. A push button telephone keyboard which has 10-number (and 2-symbol) entry buttons may then be used to enter data derived from an encryptor. The alphanumeric PIN characters 26, or other data, that a user enters on a telephone keypad (omitting Q and Z) are actually entered as numeric data 28 according to the ANSI standard keypad format, as illustrated in FIG. 5A. An institution operating a secured system may construct a table of encrypted or shuffled alphanumeric characters with, say, 16 different shuffled arrays per PIN character, as illustrated in FIGS. 5B, 5C and 5D.

In each such encrypted or shuffled array, selected few letters and numbers that are likely to be misread or improperly entered on a telephone key pad by a user, such as:

| | |
|---|---|
| O | 0 |
| I | 1 |
| S | 5 |
| B | 8 | may be segregated from random encoding or shuffling and be grouped in "error-prone" pairs. Thus, if I is encrypted or translated to V, then 1 is forced to be translated to either T, U, or 8 (all the values for the same key on a telephone key Pad). Similarly, if 5 is translated to E, then S is forced to be translated to D, F or 3, and so on for each of the identified "error-prone" pairs. The effect of these translations of the sets of such similar-looking error-prone characters is that regardless of whether a user enters, or an operator reads, a number or character erroneously, the resultant PIN digit for 1 or I is entered as the same numeric data, namely 8, and the resultant PIN digit for S or 5 is entered as the same numeric data, namely 3, and so on for each of the error-prone Pairs.

Each encrypted or shuffled array (with error-prone translations, as described above) is identified by a key-code ($K_{xx}$).

Figure 5:
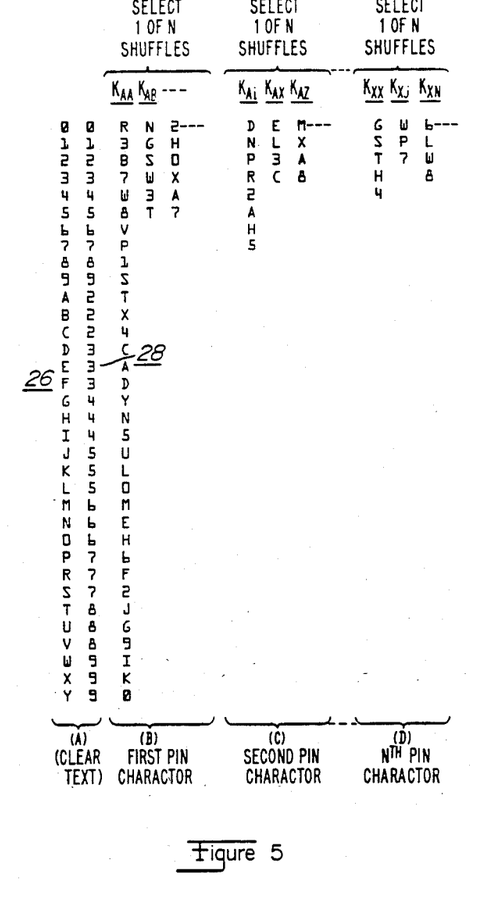
FIG. 5 is an array of encrypted alphanumeric characters associated with telephone key pad entry systems according to the present invention.

Thus, for encrypting an 8-character PIN using one-out-of-sixteen character arrays in each PIN-character Place, $(16)^8$ or approximately $4 \times 10^9$ possible combinations of character arrays are available to assemble in random sets in individual encryptors. This may be accomplished under computer control in preparation for the printing of the encryptors by randomly selecting only one of the key codes ($K_{AA}$ through $K_{XN}$) for the first PIN character-place and by Printing that shuffle or encryption in the first PIN character-place (FIG. 5B), by randomly selecting and printing another of the key-coded arrays in the second PIN character-place (FIG. 5C), and so on for the 8 PIN character-places on an encryptor (FIGS. 5, B, C and D). Of course, it is not necessary to limit the selection of an encryptor array in each PIN character-place from the same 16 possible combinations. Instead, it is also within the present invention to select any of 34 factorial encryptors or shuffled arrays of the 34 alphanumeric characters (omitting Q and Z) for Printing at each PIN character-place on an encryptor.

When an encryptor according to this embodiment is manipulated to encode a user's PIN or other data, then the encrypted PIN (or other data) and the key codes involved per PIN character are then used in connection with the table of shuffled arrays associated with such key codes to decrypt the PIN in numeric equivalent for secure storage or other subsequent data manipulations.

Figure 6:
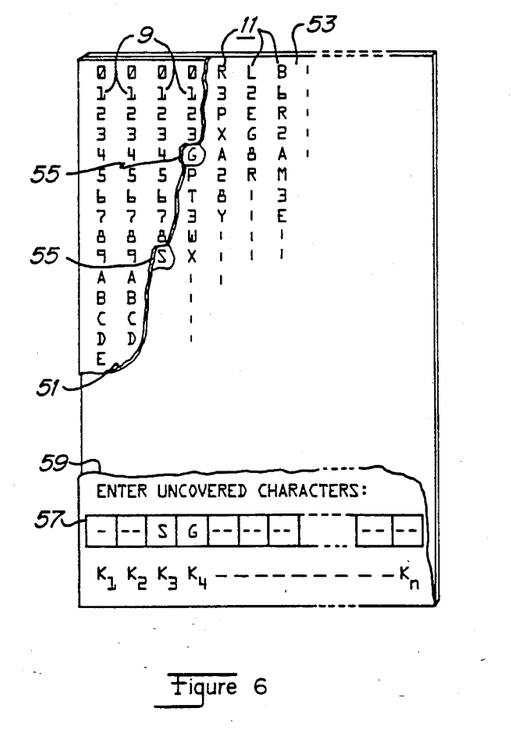
FIG. 6 is an illustration of a preferred embodiment of the present invention in which the columnar arrays of characters that are encrypted according to individual key codes ($K_x$) per column are covered by an opaque, removable coating on the surface of which is printed the clear text alphanumeric characters in registration with the underlying encrypted characters.

Referring now to FIG. 6, there is shown a preferred embodiment of the encrypted alphanumeric arrays of FIG. 1A printed in indexed relationship over the top of each other, or closely adjacent each other, and obscured by an opaque, removable coating material 51. Thus one array 9 of encrypted characters (for example, right side array of FIG. 1A) for each character place in the PIN to be encrypted is printed on a single sheet 53 and then covered over with an opaque coating material 51 that can be removed easily (e.g., by scratching away). The selected ones of the alphanumeric characters 11 which appear in clear text on the surface of the opaque coating material 51 may be scratched away 55 (one in each column array per PIN character) to expose the corresponding encoded characters beneath the coating material 51. The PIN of the prospective user is entered in clear text by scratching away the PIN characters to uncover the corresponding encrypted PIN in the covered array (perhaps in distinctive color, character fonts, positioning, etc.). The uncovered characters appearing in the columnar areas of removed coating material 51 per PIN characters constitute the encrypted PIN which may then be entered into the designated location 57 on tear-off flap 59 that also contains the key codes $K_1, K_2, --- K_n$ that identify the encryptions used within each of the columnar arrays 9, 11. Of course, the tear-off flap 59 may also contain designated areas for entering other user information such as account number, terms and conditions of use, signature, and the like, and the flap may then be returned by unsecure transmission channels to the system operator, as previously described.

Figure 7:
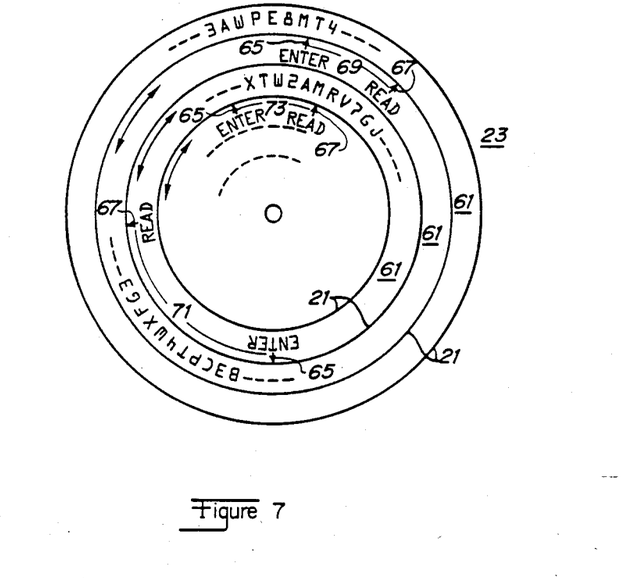
FIG. 7 is a plan view of another encryptor embodiment in which encrypted arrays of alpha numeric characters are disposed angularly around the periphery of a plural number of rotatable discs.

In another embodiment of the present invention, as illustrated in FIG. 7, the individual encryptor units 21 are formed as discs 61 of paper or plastic, or the like, with arrays of alphanumeric characters that are individually encoded by different key codes $K_i$ disposed at equi-angular locations in single or multiple cyclic iterations around the perimeter and with each disc in the assembly having progressively smaller diameter than a lower disc. The discs are held together in relatively rotatable manner by a central grommet 63, or the like, to facilitate the manual manipulation of one of a pair of indexers 65, 67 per disc adjacent a selected character around the perimeter of the next lower disc.

A prospective use enters his PIN character by character by using one indexer 65 per character per disc, and by reading off the encrypted PIN from the other indexer 67 of each pair per disc. The relative angular spacing, 69, 71, 73 between the indexers per disc constitutes an offset code D in the encrypted array of characters. Thus, the relative positioning of the corresponding indexers 65,67 per disc in alignment with selected characters of the encrypted arrays on adjacent discs constitutes accumulated offsets that further enhance the security of the system against unauthorized decrypting of a user's PIN thus encrypted. Of course, the encryptor 23 illustrated in FIG. 7 may also be printed by high-speed, computer controlled printers on a single sheet of paper along with the associated encryptor key codes $K_i$ and offset codes $D_j$, if any, and then punched and assembled to yield mass quantities of low-cost, unique encryptors 23 for mass distribution to prospective users. A tear-off flap (not shown) containing key codes, offset codes, designated locations for user entries, and the like, may also be included as part of the encryptor 23 for completion and return by the user, as previously described. It should be understood that other circular or cylindrical embodiments with individually rotatable discs or barrels of encrypted o shuffled characters about the periphery of each such disc or barrel, with pairs of indexers associated with each character array per PIN character, are within the scope of the present invention.

Figure 8:
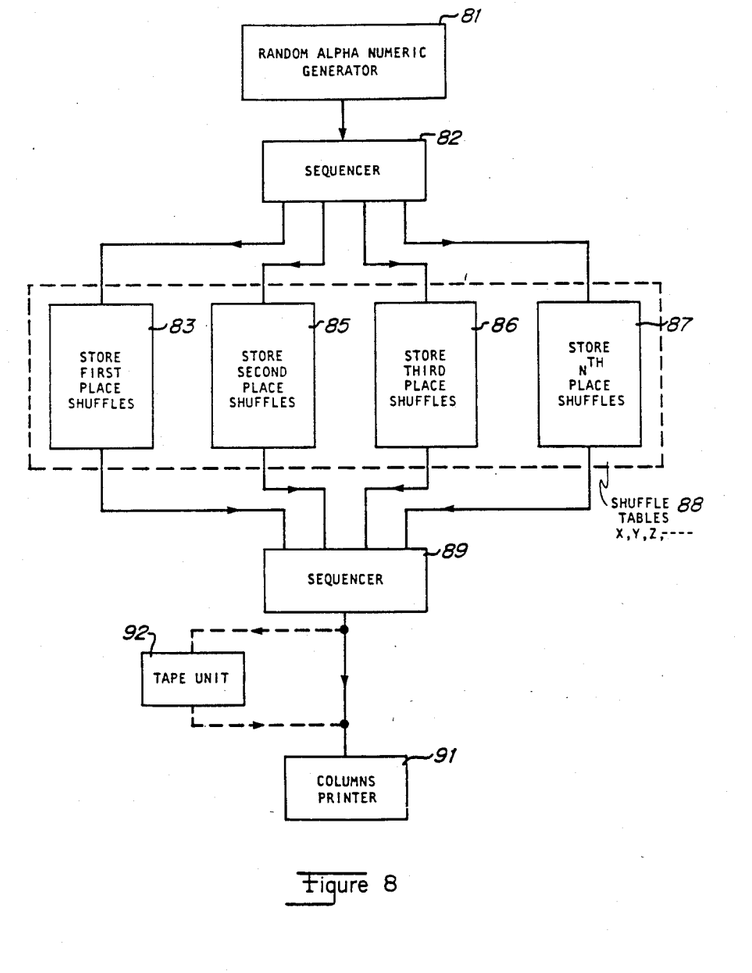
FIG. 8 is a block schematic diagram of one system for preparing tables of shuffled alphanumeric characters and printing unique encryptors.

Referring now to FIG. 8, there is shown a block diagram of one system according to the present invention for generating and printing the several columnar arrays of alphanumeric characters that are encrypted and identified by the individual key codes $K_x$. The random alphanumeric generator 81 may be a conventional hardware or software random number generator including a conventional Data Encryption standard (DES) integrated circuit (available from Motorola Co.) which operates on numerical and numeric-equivalents of alphabetical characters to generate a random shuffle of, say, 34 alphanumeric characters, as exemplified in the right column of FIG. 1A. Sixteen different alphanumeric random shuffles, each with an identifying key code $K_x$, are stored in memory 83 associated with the first character-place of an encryptor. Similarly, sixteen different alphanumeric random shuffles are then generated and stored in memory 85 associated with the second character-place of an encryptor, and so on, for N memories 86,87 associated with the third through $N^{th}$ character places of an encryptor. Sequencer 82, which may be a conventional scanner or multiplexer, is connected to apply the random alphanumeric shuffles from generator 81 to each of the memories 83,85,86 and 87 to store the requisite number 51 of alphanumeric shuffles with associated key codes in each character-place memory 83-87. The information thus stored constitutes an individual shuffle table 88 which is unique and can be assigned to a specific institution. Alternatively, sets of sixteen different random shuffles may be stored in groups with an associated group code, $G_x$, for each (rather than stored in specific corresponding PIN-character places, as shown in FIG. 8).

Sequencer 89, which may be a conventional scanner or multiplexer, is connected to access a specific alphanumeric shuffle from first-place memory 83 (or from a group memory $G_i$) with the associated key code to apply the accessed alphanumeric shuffle to Printer 91 (or to tape unit 92 which produces a tape that can be transported to printer 91). The printer 91 prints the shuffled characters in the first-place column, as exemplified by the right column of FIG. 1A, or an underside column 11 in FIG. 6. In addition, the Printer 91 prints the key code, $K_n$, associated with each shuffle on the returnable flap 59, as shown in FIG. 6. Next, the sequencer 89 and printer 91 access and print (or the tape unit 92 and printer 91 print) an alphanumeric shuffle in the next-place character column and the associated key code on the returnable flap, and so on for N columns that make up an encryptor. Of course, the printer 91 may also print the unshuffled alphanumeric characters, or these characters may be printed in conventional manner by letterpress, or the like.

Figure 9:
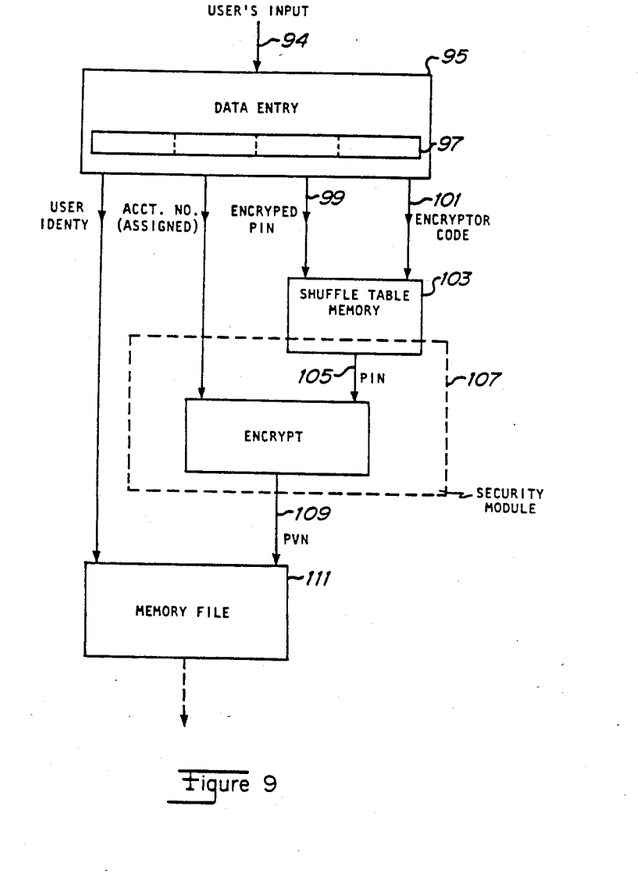
FIG. 9 is a block schematic diagram of a system for decrypting user information and signing on a verifiable user.

Referring now to FIG. 9, there is shown a block schematic diagram of one embodiment of a decryption system that operates on the information which is contained on the flap 59 of an encryptor and which is communicated by a user back to the system operator for the purpose of signing on the new user in the operator's secure system. The user of a particular encryptor communicates information 94 to the system operator via any suitable channel such as telephone, mail, or the like. Conventional data-entry apparatus 95 (which may include the operator's manual keyboard for mail returns or known translator equipment for telephone returns) assembles a code word 97 with portions or fields associated with the user's name or identity (or number equivalent), the user's assigned account number, the encrypted PIN produced by the user's manipulation of the encryptor on his own selected PIN, and the code associated with the encryptor that the user manipulates to encode his PIN. The encrypted PIN 99 and encryptor code 101 (that identifies which alphanumeric shuffles were assembled on the encryptor) are transferred to the shuffle-table memory 103 to access the decrypting equivalents, as exemplified in FIG. 1B, of each of the individual shuffles associated with the encryptor code 101. By conventional computer processing of this information, the PIN 105 selected by the user (or its numeric equivalent) may be determined and made available only as circuit signals within a security module 107 where it is DES - encrypted 108 with the assigned account number in conventional manner to yield a Personal Verification Number (PVN) 109. This PVN is stored in memory file 111 in association with the particular user's identifying data (name, number), and such new user is thereby signed into the system for subsequent verifications of the user's identity by comparisons of PVN's in commonly-known identity-checking procedures.

Therefore, the encryptors and system of the present invention greatly facilitate the sign-on procedures for new users of a computer-oriented security system by enabling random distribution of unique encryptors to prospective users, and by enabling return over unsecured communication channels of verifying data about the user which may be uniquely encrypted by simple manipulation of an inexpensive encryptor that can be used once and destroyed. Sets of numbers and characters that are subject to user errors in reading or entering on a telephone keypad are specially encoded to reduce the effects of such reading and entry errors.

We claim:

1. A data encryption apparatus for operation via a telephone keypad having a set of alphanumeric characters associated therewith comprising:
    means compiling the set of alphanumeric characters on the telephone keypad as a first array;
    encryption means translating each of the alpha and numeric characters of selected subset pairs of the first array to the same numeric value on the keypad, said encryption means translating the remaining alpha and numeric characters of the first array to numeric values on the keypad and translating the set and subset in a plurality of different ways;
    keycode means for identifying each such different translation; and
    means assembling the first array on a carrier and assembling a translation of the set and subset as a second array in fixed spatial relationship to the characters in the first array on the carrier; said means designating on said carrier the keycode associated with the translation assembled as the second array on said carrier.

2. Data encryption apparatus as in claim 1 wherein said means forms a plurality of spatially-related different second arrays and first arrays at selected character places of a multi-place data word on said carrier, and forms an indication thereon of the associated keycodes of the different translations forming the second arrays at successive character places on the carrier.

3. Data encryption apparatus as in claim 1 wherein a selected subset pair in the first and second array includes at least one of B and 8, I and 1, O and 0, S and 5, and Z and 2.

4. The method of encrypting data for operation with a telephone keypad, the method comprising the steps of:
    designating the set of alpha and numeric characters on a telephone keypad for translation to corresponding numeric values on the keypad;
    identifying subsets of alpha and numeric character pairs of the set for specific translation;
    translating the selected alpha and numeric characters of a pair in the subset to the same numeric value on the keypad;
    translating the remaining set of alpha and numeric characters to corresponding numeric values on the keypad;
    correlating the set of designated characters in a first array with the translated set and subset of alphanumeric characters in a second array for translating alpha and numeric characters designated by telephone keypad; and
    identifying the translation with an associated keycode.

5. The method according to claim 4 further comprising the steps of:
    producing a plurality of different translations of the set and subset of alpha and numeric characters;
    identifying each of the plurality of different translations with an associated keycode; and
    selecting a different translation, each with associated keycode for translating a designated set of alpha and numeric characters in each of a plurality of character places in a multi-character data word; and
    identifying the group of different translations by the keycodes associated therewith.

6. The method according to claim 4 wherein in the step of identifying the subset pairs identified include at least one of B and 8, I and 1, O and 0, S and 5, and Z and 2.

* * * * *